No. 709,838. Patented Sept. 23, 1902.
E. T. L. WILLIAMS.
MEANS FOR PREVENTING ROAD VEHICLES FROM SLIPPING SIDEWISE.
(Application filed July 22, 1902.)
(No Model.) 2 Sheets—Sheet 1.

Witnesses: Inventor:
Edmund T. L. Williams
By James L. Norris
Atty

No. 709,838. Patented Sept. 23, 1902.
E. T. L. WILLIAMS.
MEANS FOR PREVENTING ROAD VEHICLES FROM SLIPPING SIDEWISE.
(Application filed July 22, 1902.)
(No Model.) 2 Sheets—Sheet 2.
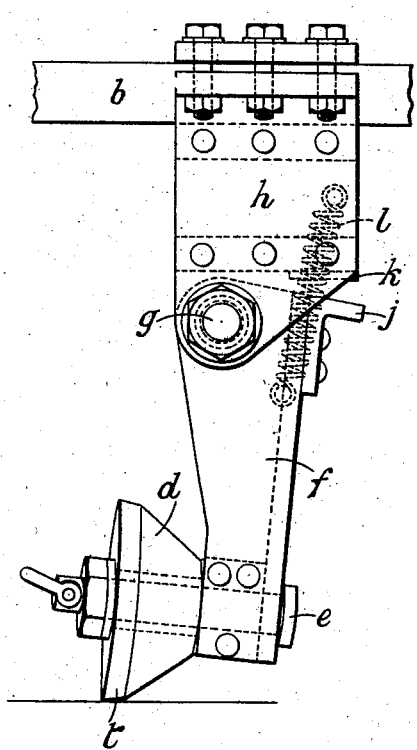
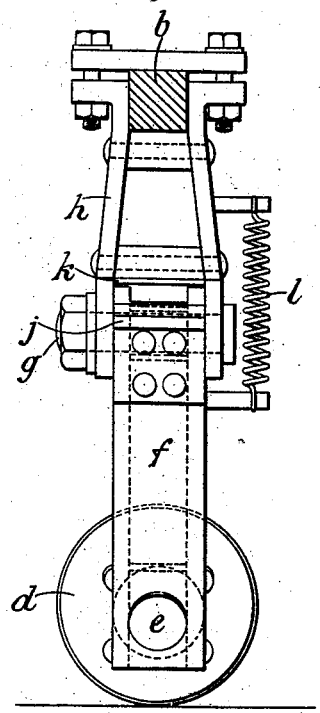
Witnesses:
Inventor:
Edmund T. L. Williams

UNITED STATES PATENT OFFICE.

EDMUND TREVOR L. WILLIAMS, OF LONDON, ENGLAND.

MEANS FOR PREVENTING ROAD-VEHICLES FROM SLIPPING SIDEWISE.

SPECIFICATION forming part of Letters Patent No. 709,838, dated September 23, 1902.

Application filed July 22, 1902. Serial No. 116,570. (No model.)

*To all whom it may concern:*

Be it known that I, EDMUND TREVOR LLOYD WILLIAMS, a subject of the King of Great Britain, residing at London, England, have invented certain new and useful Improvements in Means for Preventing Road-Vehicles Slipping Sidewise, of which the following is a specification.

This invention relates to improved means for preventing road-vehicles slipping sidewise and is more especially intended for use on motor-cars, in which, as is well known, there is a tendency to slip sidewise when traveling on muddy, moist, dusty, or very smooth roads. The said invention is, however, not only applicable to motor-cars, but can be usefully employed on horse-drawn vehicles to prevent lateral slipping, especially of the rear wheels of four-wheeled vehicles.

According to my said invention I provide rollers with running-surfaces in the form of cones or frustra of cones and having sharp edges formed at the larger ends thereof. Said rollers are rotatably mounted on the vehicle by means of swing-frames in such a manner that they can be raised out of contact with the road-surface when required. They are, moreover, arranged between the rear wheels of a four-wheeled vehicle, with their sharp edges toward the center line of the vehicle. When the vehicle is running normally, the smooth conical surfaces of the rollers run on the road-surface without causing injury thereto. When, however, the vehicle slips sidewise, the sharp edges of the rollers engage with the road-surface and effectually resist any sudden lateral movement of the vehicle without impeding its forward or backward motion.

My said invention also comprises detail improvements hereinafter set forth.

Figure 1:
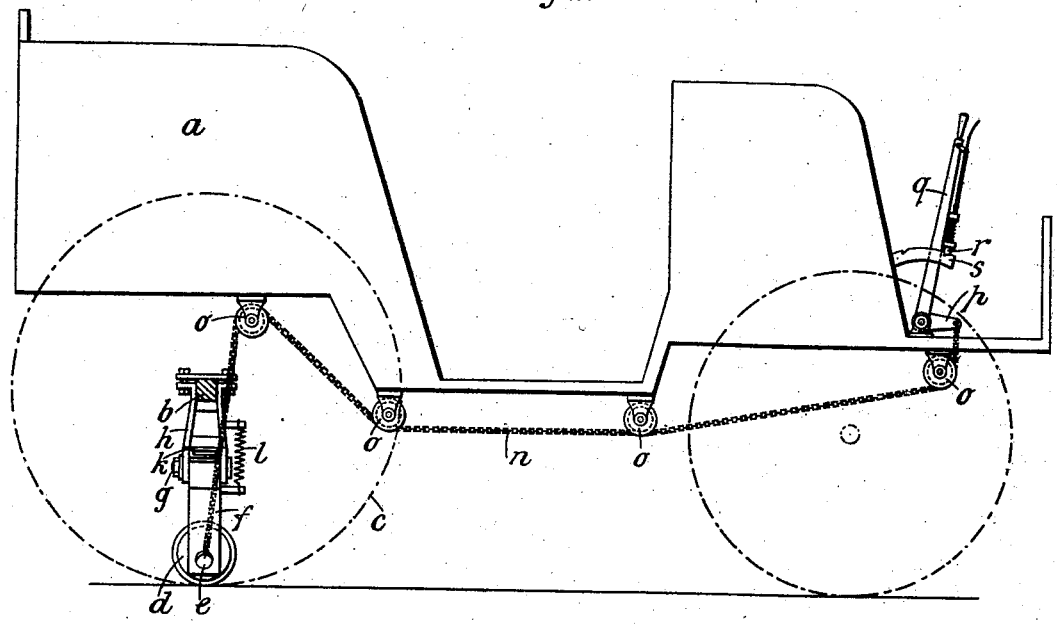
Figure 2:
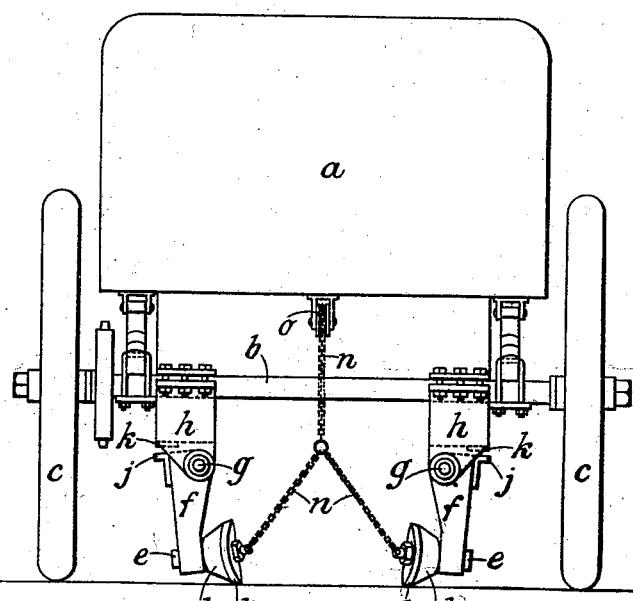

In the accompanying drawings, Figure 1 is a side elevation, and Fig. 2 an end elevation, of a motor-car having my invention applied thereto. Figs. 3 and 4 are rear and side elevations, respectively, drawn to an enlarged scale, showing one of the rollers and the supporting-arm thereof.

$a$ is the body of the vehicle.

$b$ is the rear axle, and $c\ c$ are the wheels.

$d\ d$ are conical rollers rotatably mounted on pins $e\ e$, fixed in arms $f\ f$. These arms are hinged at $g\ g$ to brackets $h\ h$, clamped to the axle $b$, and are limited in their outward swing by means of stops $j\ j$, which abut against corresponding projections $k\ k$ on the brackets $h\ h$. In order to insure that the rollers $d$ shall remain in contact with the ground, I provide on each bracket a spring $l$, which tends to bring the part $j$ into contact with the projection $k$. In cases where the weight of the roller $d$ and its arm $f$ is sufficient to hold the said roller down the spring $l$ can be dispensed with. The length of the arms $f$ is made such that the smooth conical surface $t$ on the rollers $d$ comes normally into contact with the ground, as shown in Fig. 2. When, however, side slip tends to occur, the sharp edges on the larger ends of the said rollers come into engagement with the road-surface and effectually prevent side slip. The arrangement of the brackets $h$ with their arms $f$ as near the wheels $c$ as practicable (see Fig. 2) insures the maximum stability of the vehicle when the latter is slipping sidewise, the operative roller $d$, which is preventing side slip, being the one farthest removed from the wheel $c$ about which the vehicle tends to overturn.

Chains $n$ are provided for raising the arms $f$ when required. Said chains are shown extending over pulleys $o$ and connected to one arm $p$ of a lever $p\ q$. The arm $q$ of this lever is provided with a catch $r$ for engaging with a notched segment $s$, so as to enable the rollers $d\ d$ to be raised out of contact with the ground and retained in such position while the vehicle is passing over roads where there is no danger of side slip. When, however, the vehicle is passing over slippery roads, the arms $f\ f$ are lowered, so as to bring the rollers $d\ d$ into contact with the ground. The pins $e$ instead of being exactly in line with the axle are preferably inclined backward slightly, as shown, so that the rollers when in contact with the ground will tend to run inward and will thus be prevented from taking the weight of the vehicle-wheels.

I have shown my improved device attached to the axle of the vehicle; but in those cases where such construction is not permissible it may be attached to the frame of the vehicle.

What I claim is—

1. A device for the purpose specified, comprising a roller having a conical running-surface, a sharp edge at the end of said conical surface, a bearing for said roller, and a swing-arm carrying said bearing, substantially as described.

2. The combination, with a road-vehicle, of two arms pivoted thereto so as to be free to swing inwardly, one arm being adjacent to each wheel, stops to limit the outward swing of said arms, conical rollers rotatably carried by said arms, the axes of the rollers being inclined inwardly and rearwardly, substantially as described.

3. A device for the purpose specified, comprising rollers having conical running-surfaces, sharp edges at the ends of said conical surfaces, bearing-surfaces on said rollers, bearing-pins to receive said rollers, swinging arms to support said pins, brackets pivotally attached to said arms, stops for limiting the outward motion of said arms, and springs connecting said arms and said brackets, substantially as described.

4. The combination, with a road-vehicle, of brackets, arms pivotally attached to said brackets, stops for said arms, conical rollers rotatably mounted on said arms, and means for raising said rollers out of contact with the ground, substantially as described.

5. The combination, with a road-vehicle, of arms pivotally mounted on said vehicle, stops for said arms, conical rollers rotatably mounted on said arms and having their axes inclined backward at their inner ends, and sharp edges on the inner ends of said rollers, substantially as described.

6. The combination, with a road-vehicle, of arms pivotally mounted thereon, stops for said arms, and rollers having projecting edges and rotatably mounted on said arms, the axes of said rollers being inclined backward at their inner ends, substantially as described.

7. The combination, with the rear wheels of a road-vehicle, of arms pivotally mounted on the inner sides of said wheels, means for limiting the movement of said arms in an outward direction, conical rollers having projecting edges and rotatably mounted on said arms, and means for raising said rollers out of contact with the ground, substantially as described.

In testimony whereof I have hereunto set my hand in presence of two subscribing witnesses.

E. TREVOR L. WILLIAMS.

Witnesses:
 GEORGE HARRISON,
 CONRAD K. FALKENSTEIN.